(12) United States Patent
Geraci

(10) Patent No.: US 9,945,639 B1
(45) Date of Patent: Apr. 17, 2018

(54) OPTIC ATTACHMENT FOR A FIREARM SCOPE

(71) Applicant: Richard Geraci, Sugar Grove, OH (US)

(72) Inventor: Richard Geraci, Sugar Grove, OH (US)

( * ) Notice: Subject to any disclaimer, the term of this patent is extended or adjusted under 35 U.S.C. 154(b) by 0 days.

(21) Appl. No.: 15/614,762

(22) Filed: Jun. 6, 2017

(51) Int. Cl.
| | |
|---|---|
| *F41G 1/38* | (2006.01) |
| *F41G 3/08* | (2006.01) |
| *G02B 15/10* | (2006.01) |
| *G02B 27/00* | (2006.01) |
| *G02B 7/02* | (2006.01) |
| *G02B 23/16* | (2006.01) |

(52) U.S. Cl.
CPC ............... *F41G 1/383* (2013.01); *F41G 3/08* (2013.01); *G02B 7/02* (2013.01); *G02B 15/10* (2013.01); *G02B 23/16* (2013.01); *G02B 27/0006* (2013.01); *G02B 27/0025* (2013.01)

(58) Field of Classification Search
CPC ............ F41G 1/383; F41G 1/38; G02B 23/16
See application file for complete search history.

(56) References Cited

U.S. PATENT DOCUMENTS

| | | |
|---|---|---|
| D264,851 S | 6/1982 | Huckenbeck |
| 5,495,676 A * | 3/1996 | Chesnut ................. F41G 1/383 |
| | | 359/511 |
| 5,726,731 A | 3/1998 | Toler |
| 6,819,495 B2 | 11/2004 | Shani |
| 6,898,889 B1 | 5/2005 | Toler |
| 7,204,052 B2 | 4/2007 | Swan |
| 9,459,440 B2 | 10/2016 | Zheng |
| 2002/0167731 A1 * | 11/2002 | Watson ................. G02B 23/16 |
| | | 359/611 |
| 2010/0095577 A1 * | 4/2010 | Tsai ........................ F41G 1/383 |
| | | 42/129 |

FOREIGN PATENT DOCUMENTS

EP    1457756    * 9/2004

* cited by examiner

*Primary Examiner* — Stephen Johnson
(74) *Attorney, Agent, or Firm* — Kyle A. Fletcher, Esq.

(57) ABSTRACT

The optic attachment for a firearm scope mounts onto the ocular lens end of a scope. The optic attachment for a firearm scope provides a flip-up cap that exposes an corrective lens in the optical path through the scope when the flip-up cap is open and protects the lens at the ocular end of the scope when the flip-up cap is closed. The corrective lens may improve the vision of the shooter, either by providing prescriptive correction or by providing magnification. The flip-up cap may comprise a mirror that can be used in emergency survival situations as a signaling device. An information chart, such as a ballistics chart, may be applied to the mirror and may be removed when use of the mirror is required. The corrective lens may be used as a fire starter by focusing solar rays.

12 Claims, 5 Drawing Sheets

OPTIC ATTACHMENT FOR A FIREARM SCOPE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of firearms, more specifically, an optic attachment for a firearm scope.

SUMMARY OF INVENTION

The optic attachment for a firearm scope mounts onto the ocular lens end of a scope. The optic attachment for a firearm scope provides a flip-up cap that exposes a corrective lens in the optical path through the scope when the flip-up cap is open and protects the lens at the ocular end of the scope when the flip-up cap is closed. The corrective lens may improve the vision of the shooter, either by providing prescriptive correction or by providing magnification. The flip-up cap may comprise a mirror that can be used in emergency survival situations as a signaling device. An information chart, such as a ballistics chart, may be applied to the mirror and may be removed when use of the mirror is required. The corrective lens may be used as a fire starter by focusing solar rays.

An object of the invention is to provide improved vision to a shooter by adding a corrective or magnifying lens to the ocular lens end of a firearm scope.

Another object of the invention is to provide a protective, flip-up cover in front of the corrective or magnifying lens.

A further object of the invention is to provide a mirror in the flip-up cap for emergency signaling.

Yet another object of the invention is to provide a removable informational chart, such as a ballistics chart, on the surface of the mirror.

These together with additional objects, features and advantages of the optic attachment for a firearm scope will be readily apparent to those of ordinary skill in the art upon reading the following detailed description of the presently preferred, but nonetheless illustrative, embodiments when taken in conjunction with the accompanying drawings.

In this respect, before explaining the current embodiments of the optic attachment for a firearm scope in detail, it is to be understood that the optic attachment for a firearm scope is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the optic attachment for a firearm scope.

It is therefore important that the claims be regarded as including such equivalent construction insofar as they do not depart from the spirit and scope of the optic attachment for a firearm scope. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive. As used herein, the term "optical quality" is intended to mean appropriate for use in an application that requires seeing through a material; optical quality materials are generally free from visible defects and have chromatic and refractive properties which do not distort images when viewed through the material.

Figure 1:
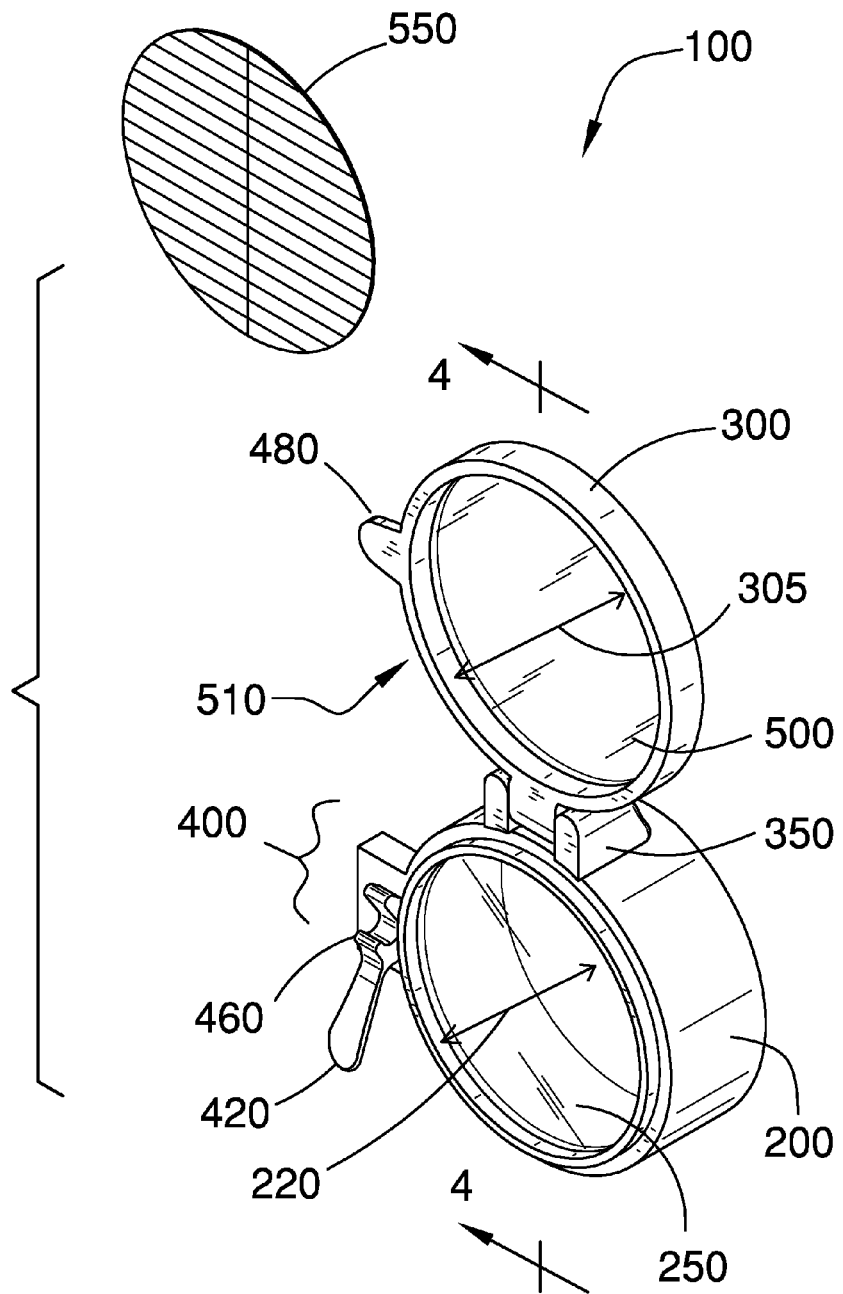
FIG. 1 is a perspective view of an embodiment of the disclosure.
Figure 2:
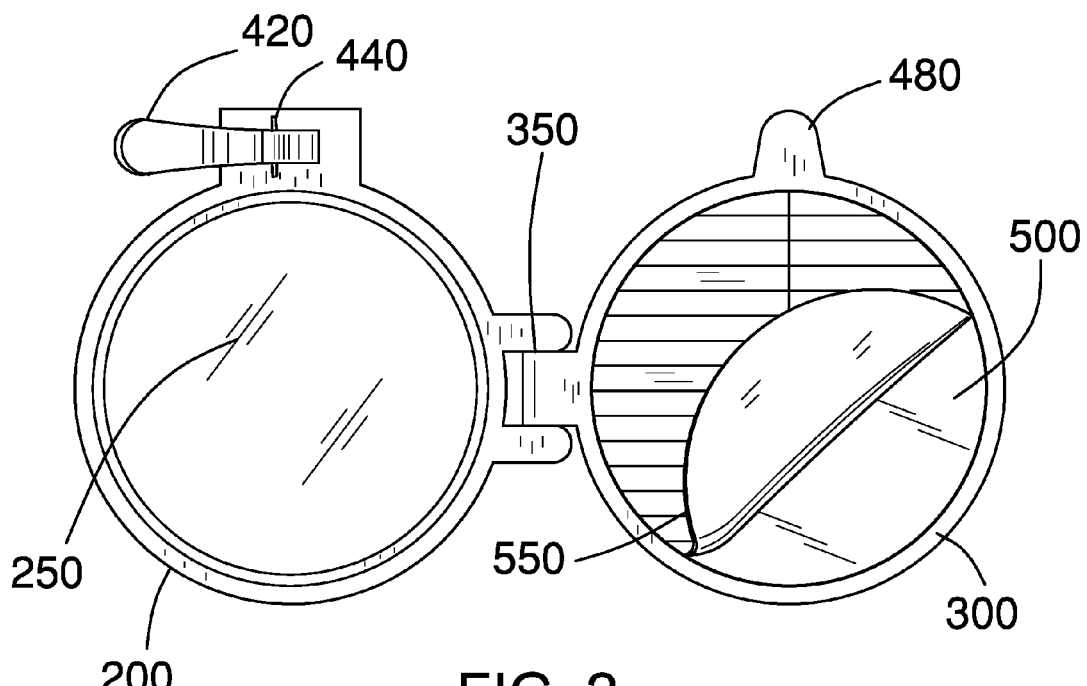
FIG. 2 is a front view of an embodiment of the disclosure.
Figure 3:
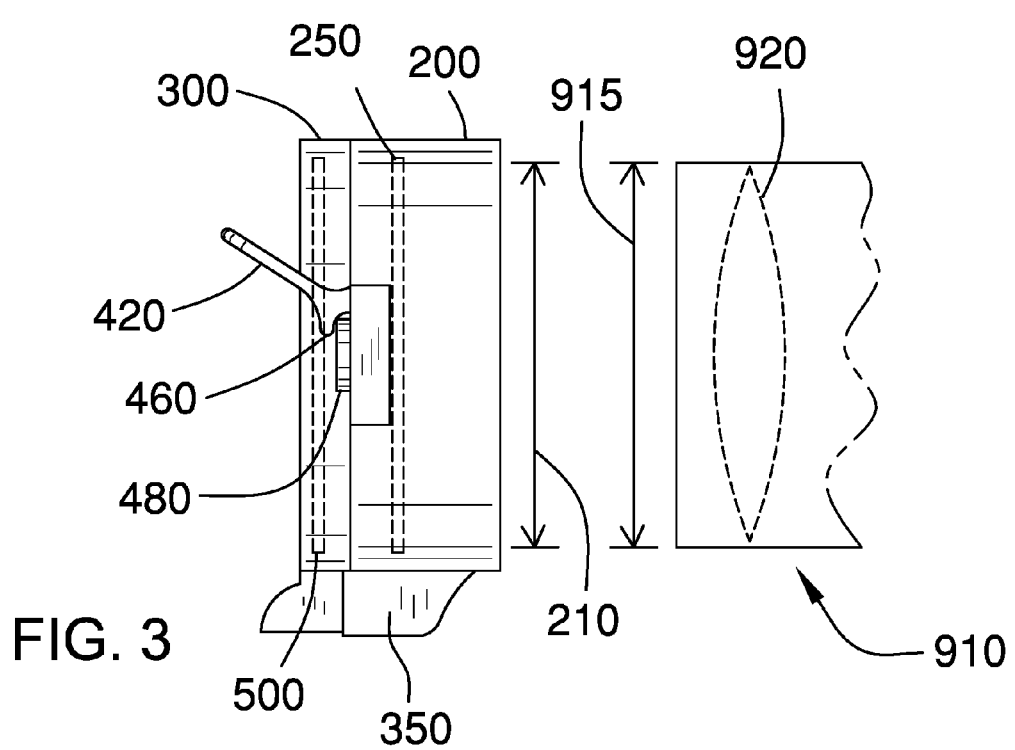
FIG. 3 is a side view of an embodiment of the disclosure.
Figure 4:
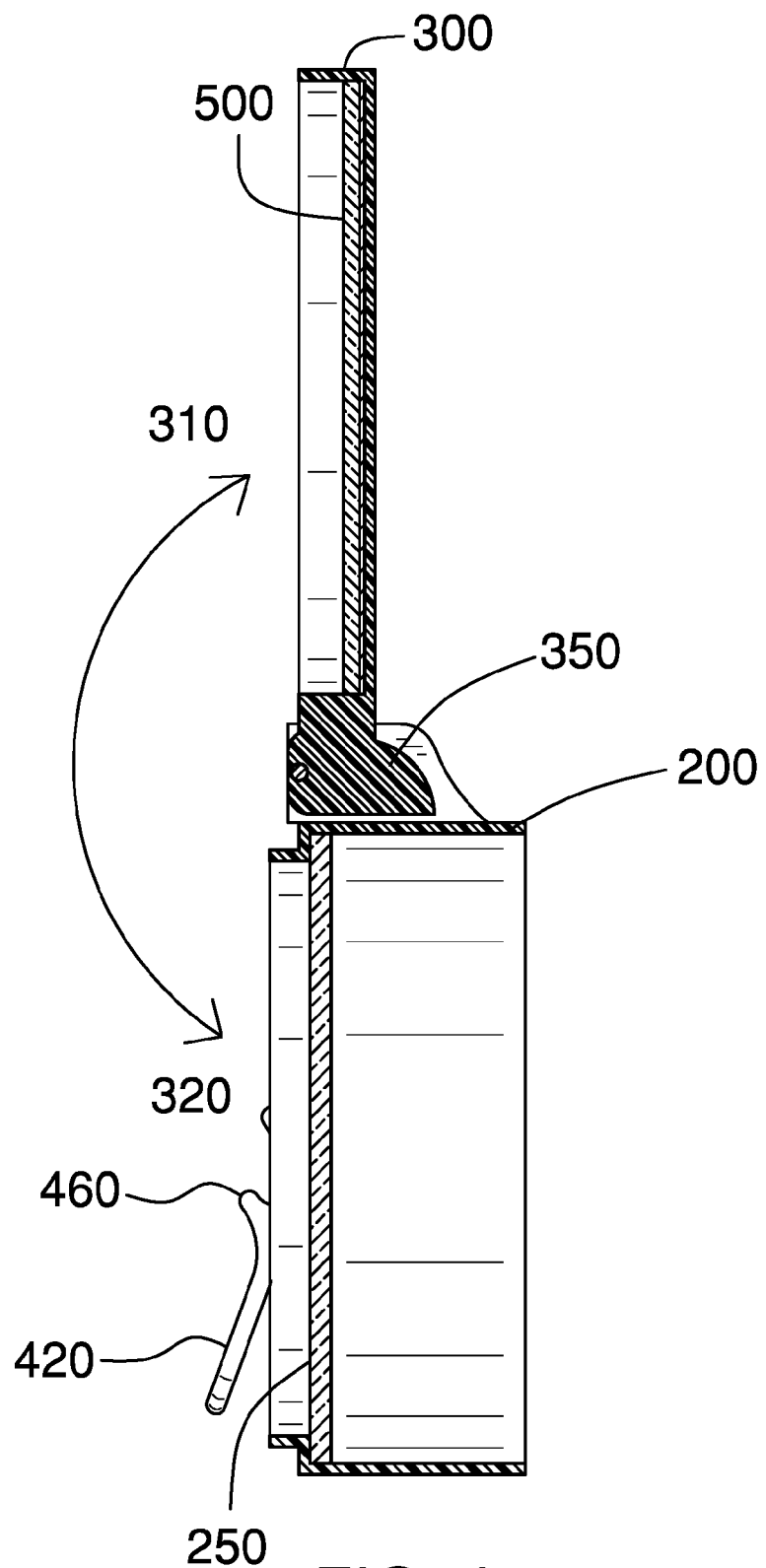
FIG. 4 is a cross-sectional view of an embodiment of the disclosure across 4-4 as shown in FIG. 1.
Figure 5:
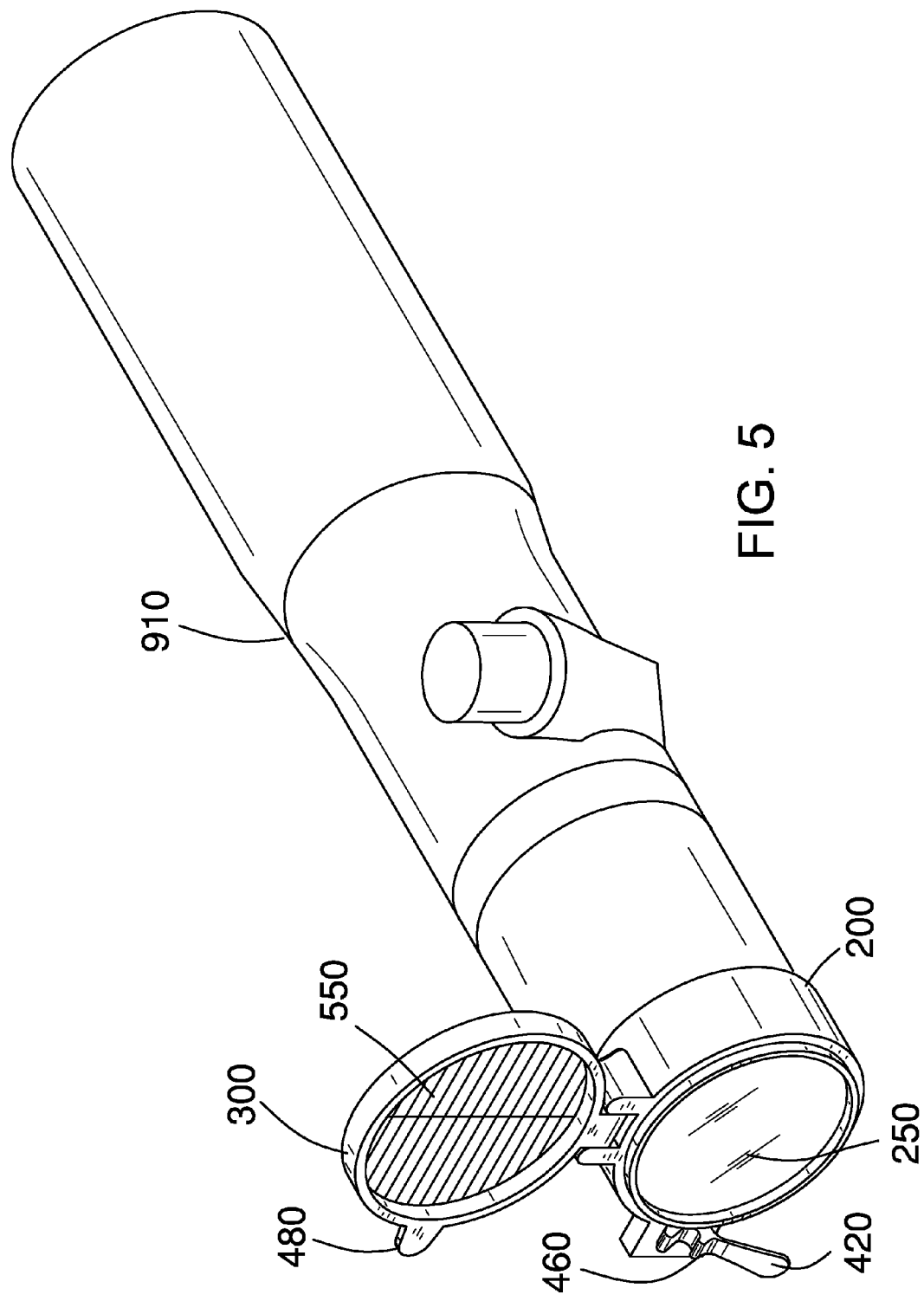
FIG. 5 is a view of an embodiment of the disclosure in use on a spotting scope.
Figure 6:
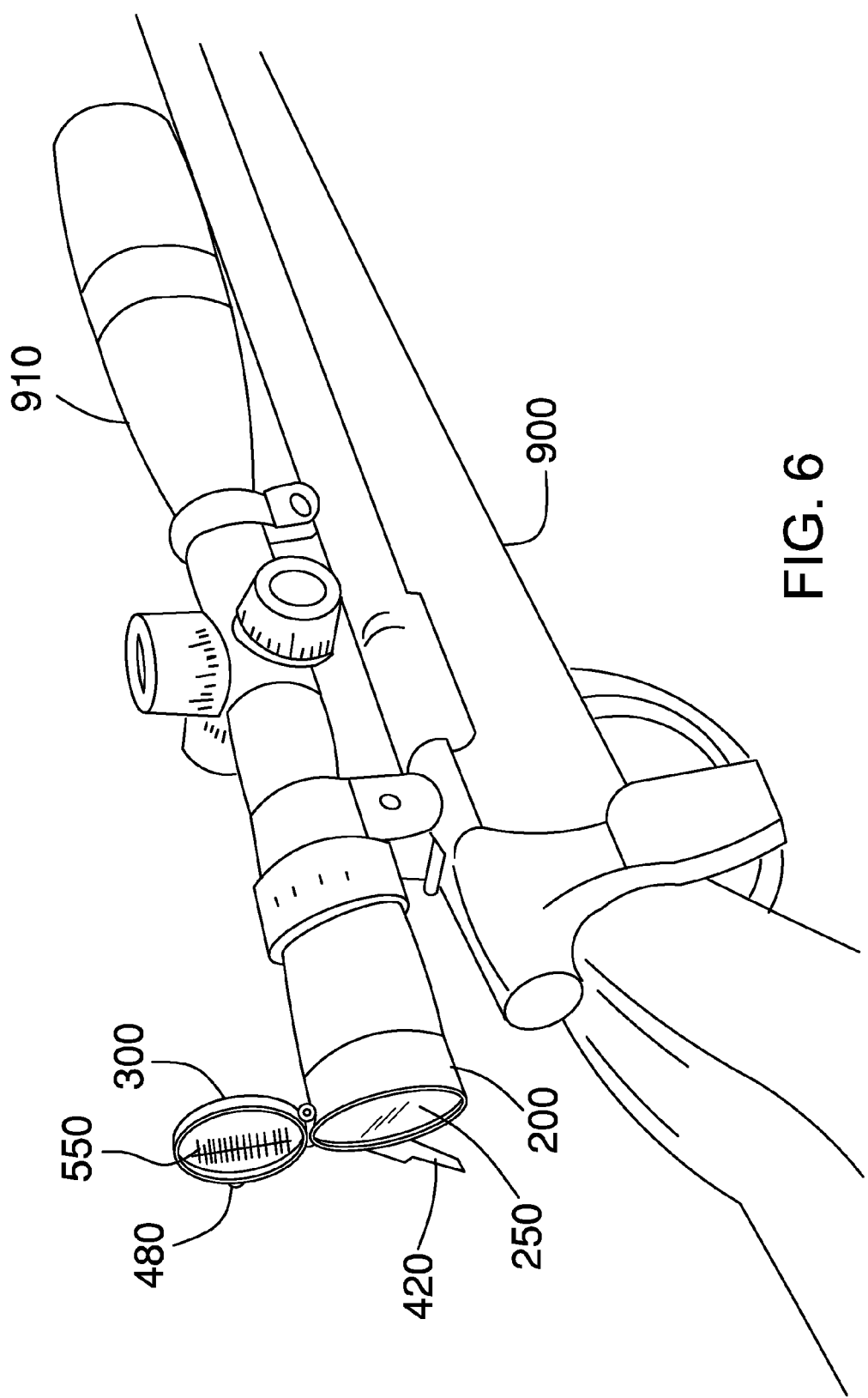
FIG. 6 is a view of an embodiment of the disclosure in use on a variable power rifle scope.

Detailed reference will now be made to a first potential embodiment of the disclosure, which is illustrated in FIGS. 1 through 6.

The optic attachment for a firearm scope 100 (hereinafter invention) comprises a mounting ring 200, a corrective lens 250 and a flip-up cap 300. The optic attachment for a firearm scope 100 mounts onto an ocular lens 920 end of a scope 910 of a firearm 900. When the flip-up cap 300 is in an open position 310, the corrective lens 250 may be in a position to improve the vision of a shooter (not illustrated in the figures). When the flip-up cap 300 is in a closed position 320, the flip-up cap 300 may protect the corrective lens 250.

The mounting ring 200 mounts onto the scope 910 of the firearm 900 by placing the mounting ring 200 over the ocular lens 920 end of the scope 910 and pressing the mounting ring 200 onto the scope 910. An inner diameter of the mounting ring 210 matches an outer diameter of scope 915 resulting in an interference fit between the mounting ring 200 and the scope 910 and this interference fit holds the mounting ring 200 in place. The corrective lens 250 is mounted within the mounting ring 200 such that when the shooter looks into the ocular lens 920 of the scope 910 they must look through the corrective lens 250 to look through the scope 910.

The corrective lens 250 is a shaped, clear piece of optical quality glass or plastic. The specific shape given to the corrective lens 250 determines what effect the corrective lens 250 will have relative to improving the vision of the shooter.

In some embodiments, the corrective lens 250 may be a prescriptive shape intended to correct the vision of the shooter. If the shooter normally wears glasses (not illustrated in the figures), use of the optic attachment for a firearm scope 100 may allow the shooter to see well enough to aim and shoot without using the glasses. This may be desirable in cases where the glasses of the shooter have been broken or lost or in cases where the shooter prefers not to wear the glasses.

In some embodiments, the corrective lens 250 may be shaped to provide magnification instead of prescriptive vision correction.

The corrective lens 250 may exhibit other desirable characteristics of the glasses. As non-limiting examples, the corrective lens 250 may be made from impact resistance material or the corrective lens 250 may have anti-glare coatings or properties.

In emergency survival situations, the corrective lens 250 may be used to focus solar rays onto tinder in order to start a fire for warmth, cooking, or signaling.

The flip-up cap 300 is hingedly coupled to the mounting ring 200 via a cap hinge 350. An inner diameter of cap 305 is at least as large as an outer diameter of mounting ring 220. When the flip-up cap 300 is in the closed position 320 the flip-up cap 300 contacts the mounting ring 200 and thus forms a seal that allows the flip-up cap 300 to protect the corrective lens 250 from water, dust, dirt, other contamination and scratches. The flip-up cap 300 may further comprise a mirror 500.

The mirror 500 may be mounted inside of the flip-up cap 300 so that the mirror 500 is protected from damage between the flip-up cap 300 and the corrective lens 250 when the flip-up cap 300 is in the closed position 320. When the flip-up cap 300 is in the open position 310, the mirror 500 is exposed and a reflective side of the mirror 510 may face the shooter.

The mirror 500 may be used when dealing with emergency survival situations. As a non-limiting example, the optic attachment for a firearm scope 100 may be removed from the scope 910 and the mirror 500 may be used as a signaling device by moving the mirror 500 so that it reflects sunlight towards a potential rescuer. As a further non-limiting example, the mirror 500 may be used by the shooter to remove debris from an eye of the shooter (not illustrated in the figures) or when treating facial wounds where it may be necessary for the shooter to see their own face. The mirror 500 may have a metal or plastic backing for support and this backing may be formed by the flat surface of the flip-up cap 300.

The mirror 500 may be covered by a data chart sticker 550. The data chart sticker 550 may be an adhesive-backed piece of paper or plastic with information printed on the non-adhesive side. As a non-limiting example, the data chart sticker 550 may be printed with a ballistics chart showing the correlation between 'range to target' and 'drop in trajectory' of a bullet. The flip-up cap 300 may thus present useful information to the shooter when the flip-up cap 300 is in the open position 310. In an emergency survival situation, the data chart sticker 550 may be removed from the flip-up cap 300 revealing the reflective side of the mirror 510, which may then be used for signaling. After the emergency survival situation is resolved, the shooter may choose to replace the data chart sticker 550 with the same or different information chart.

The flip-up cap 300 may be retained in the closed position 320 by the interaction of a protrusion on the cap 480 with a cap latch 400 on the mounting ring 200. Specifically, the cap latch 400 may comprise a catch 460 pivotally mounted on the mounting ring 200 via a latch pivot 440 and a handle 420 that is connected to the catch 460. Closing the flip-up cap 300 may force the protrusion on the cap 480 past the catch 460. A spring (not illustrated in the figures) may force the catch 460 to move to a position where it grasps the protrusion on the cap 480 and thus prevents the flip-up cap 300 from opening. The shooter may release the flip-up cap 300 by pressing the handle 420 thus moving the catch 460 away from the protrusion on the cap 480.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. An optic attachment for a firearm scope comprising: a mounting ring, a corrective lens and a flip-up cap; wherein the optic attachment mounts onto an ocular lens end of a scope of a firearm;
wherein when the flip-up cap is in an open position, the corrective lens is in a position to improve a vision of a shooter;
wherein when the flip-up cap is in a closed position, the flip-up cap protects the corrective lens;
wherein the mounting ring mounts onto the scope of the firearm by placing the mounting ring over the ocular lens end of the scope and pressing the mounting ring onto the scope;
wherein an inner diameter of the mounting ring matches an outer diameter of scope resulting in an interference fit between the mounting ring and the scope;
wherein the interference fit holds the mounting ring in place;
wherein the corrective lens is mounted within the mounting ring such that when the shooter looks into an ocular lens of the scope, said shooter looks through the corrective lens to look through the scope;

wherein the corrective lens is a shaped, clear piece of optical quality glass or plastic;

wherein the specific shape given to the corrective lens determines what effect the corrective lens will have relative to improving the vision of the shooter;

wherein the optic attachment for a firearm scope is removed from the scope and the corrective lens is used to focus solar rays in order to start a fire;

wherein the flip-up cap is hingedly coupled to the mounting ring via a cap hinge;

wherein an inner diameter of cap is at least as large as an outer diameter of mounting ring;

wherein when the flip-up cap is in the closed position the flip-up cap contacts the mounting ring and thus forms a seal that allows the flip-up cap to protect the corrective lens from contamination and scratches;

wherein the flip-up cap comprises a mirror;

wherein the mirror is mounted inside of the flip-up cap so that the mirror is protected from damage between the flip-up cap and the corrective lens when the flip-up cap is in the closed position;

wherein when the flip-up cap is in the open position, the mirror is exposed and a reflective side of the mirror faces the shooter.

2. The optic attachment for a firearm scope according to claim 1 wherein the corrective lens is a prescriptive shape intended to correct the vision of the shooter.

3. The optic attachment for a firearm scope according to claim 1 wherein the corrective lens is shaped to provide magnification.

4. The optic attachment for a firearm scope according to claim 1 wherein the corrective lens comprises has an anti-glare coating.

5. The optic attachment for a firearm scope according to claim 1 wherein the optic attachment for a firearm scope is removed from the scope and the mirror is used as a signaling device.

6. The optic attachment for a firearm scope according to claim 5 wherein the mirror has a backing for support.

7. The optic attachment for a firearm scope according to claim 6 wherein the backing is formed by a flat surface of the flip-up cap.

8. The optic attachment for a firearm scope according to claim 5 wherein the mirror is covered by a data chart sticker.

9. The optic attachment for a firearm scope according to claim 8 wherein the data chart sticker is an adhesive-backed piece of paper or plastic with information printed on the non-adhesive side.

10. The optic attachment for a firearm scope according to claim 9 wherein the data chart sticker is printed with a ballistics chart.

11. The optic attachment for a firearm scope according to claim 9 wherein the data chart sticker is removable from the flip-up cap revealing a reflective side of the mirror.

12. The optic attachment for a firearm scope according to claim 8 wherein the flip-up cap is retained in the closed position by the interaction of a protrusion on the cap with a cap latch on the mounting ring.

* * * * *